United States Patent [19]

Park

[11] Patent Number: 5,663,808
[45] Date of Patent: Sep. 2, 1997

[54] DEVICE AND METHOD FOR AUTOMATICALLY TRANSMITTING DOCUMENTS IN A FACSIMILE SYSTEM

[75] Inventor: Joo-Seung Park, Gumi, Rep. of Korea

[73] Assignee: SamSung Electronics Co., Ltd., Suwon, Rep. of Korea

[21] Appl. No.: 555,990

[22] Filed: Nov. 15, 1995

[30] Foreign Application Priority Data

Dec. 27, 1994 [KR] Rep. of Korea ............... 37373/1994

[51] Int. Cl.$^6$ .............................. H04N 1/32; H04N 1/00; H04N 1/04; G06K 9/00
[52] U.S. Cl. ...................... 358/440; 358/468; 358/407; 358/498; 358/474; 382/181
[58] Field of Search ........................... 358/440, 468, 358/453, 407, 498, 496, 474, 497; 382/181

[56] References Cited

U.S. PATENT DOCUMENTS

| | | | |
|---|---|---|---|
| 4,670,791 | 6/1987 | Murata et al. | 358/441 |
| 5,194,967 | 3/1993 | Nonomura | 358/434 |
| 5,206,743 | 4/1993 | Hochman et al. | 358/440 |
| 5,237,428 | 8/1993 | Tajitsu et al. | 358/440 |
| 5,247,591 | 9/1993 | Baran | 358/440 |
| 5,301,035 | 4/1994 | Hayafune | 358/440 |
| 5,384,836 | 1/1995 | Otsuka | 358/440 |
| 5,404,231 | 4/1995 | Bloomfield | 358/400 |
| 5,543,938 | 8/1996 | Fukushima | 358/407 |

*Primary Examiner*—Kim Vu
*Assistant Examiner*—Tia M. Harris
*Attorney, Agent, or Firm*—Robert E. Bushnell, Esq.

[57] ABSTRACT

A device for automatically transmitting a document in a facsimile system includes a central processing unit (CPU) that enables automatic transmission of image data from a document by dialing a telephone number recorded on the document in response to entry of a transmission start key. A key input unit includes the transmission start key and a number of function keys and provides key data to the central processing unit (CPU). A scanner scans the image data and the telephone number recorded on the document and converts the scanned image into digital image data. A pattern recognition unit recognizes the pattern of the telephone number scanned by the scanner. A dialing unit transmits a dialing signal through a public telephone network, and a line interface unit (LIU) forms a data transmission path with a receiving facsimile device to enable transmission of the image data.

12 Claims, 4 Drawing Sheets

DEVICE AND METHOD FOR AUTOMATICALLY TRANSMITTING DOCUMENTS IN A FACSIMILE SYSTEM

CROSS-REFERENCE TO RELATED APPLICATIONS

This application makes reference to, incorporates the same herein, and claims all benefits accruing under 35 U.S.C. §119 from an application for Device And Method For Automatically Transmitting Documents In A Facsimile System earlier filed in the Korean Industrial Property Office on 27 Dec. 1994 and there assigned Ser. No. 37373/1994.

BACKGROUND OF THE INVENTION

The present invention relates to a facsimile system, and more particularly to a device and method for transmitting image data read from a document by recognizing a receiver's telephone number recorded on the document, automatically dialing the receiver's telephone number, and transmitting the image data read from the document to the receiver.

In conventional facsimile art, a user typically enables transmission of image data from a document to a receiving party's facsimile device by manually entering the telephone number for the receiving facsimile device, and then feeding the document into the transmitting facsimile device. The transmitting facsimile device then scans the image data and transmits the image data to the receiving facsimile device via a telephone line connecting the two facsimile devices. While this conventional technique for transmitting a facsimile has been generally accepted by most users, I believe that improvements can be contemplated so that the facsimile transmission process is further simplified.

SUMMARY OF THE INVENTION

It is an object of the present invention to provide an improved device and method for transmitting image data read from a document in a facsimile system.

It is another object to provide a device and method for reading image data corresponding to a receiver's telephone number from a specific region on a document.

It is still another object to provide a device and method for identifying a receiver's telephone number from image data recorded upon the face of a document so that the receiver's telephone number can be automatically dialed.

It is yet another object to provide a device and method for automatically transmitting image data from a document to a receiver by identifying the receiver's telephone number amongst image data on the document and automatically dialing the receiver's telephone number.

It is still yet another object to provide a device and method that eliminates the need for a user to manually input the telephone number of a receiving party during a facsimile transmission operation.

To achieve these and other objects, the present invention provides a central processing unit (CPU) that enables automatic transmission of image data from a document by dialing a telephone number recorded on the document. A key input unit includes a transmission start key and a number of function keys for providing entry of key data. A scanner scans an image and the telephone number recorded on the document, and converts the scanned image into digital image data. A document detecting sensor senses a loading state of the document based on inputs from the scanner. A pattern recognition unit recognizes the pattern of the telephone number scanned by the scanner. A dialing unit transmits a dialing signal through a public telephone network. A line interface unit (LIU) forms a data transmission path and interfaces signals between the public telephone network and the facsimile system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
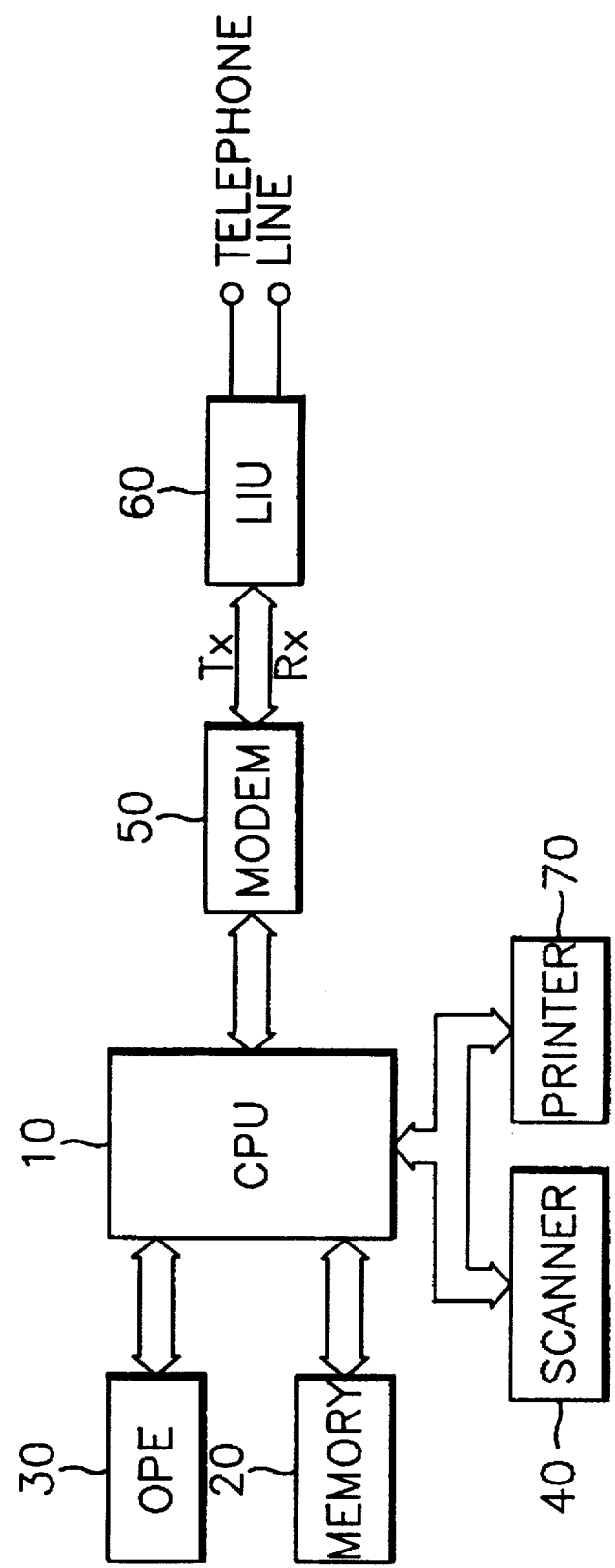
FIG. 1 is a block diagram illustrating the construction of a conventional facsimile system.

Turning now to the drawings and referring to FIG. 1, a block diagram illustrating the construction of a conventional facsimile system is shown. FIG. 1 includes a central processing unit (CPU) 10, a memory 20, an operating panel (OPE) 30, a scanner 40, a modulator-demodulator (MODEM) 50, a line interface unit (LIU) 60, and a primer 70. Central processing unit (CPU) 10 controls the facsimile system in accordance with a given program. Memory 20 stores protocol data and transmission data which is accessed and stored under the control of central processing unit (CPU) 10. Operating panel (OPE) 30 has a plurality of keys for generating key data and providing the key data to central processing unit (CPU) 10, and a display unit for displaying the data. Scanner 40 scans image data from a document and transmits digital data representative of the image data to central processing unit (CPU) 10. Modulator-demodulator (MODEM) 5 modulates data output from central processing unit (CPU) 10 to generate an analog signal, and simultaneously demodulates a received analog signal to generate digital data, under the control of central processing unit (CPU) 10. Line interface unit (LIU) 60 forms a data transmission path with a public telephone network and interfaces signals between the public telephone network and modulator-demodulator (MODEM) 50 under the control of central processing unit (CPU) 10. Printer 70 prints data in response to a control signal from central processing unit (CPU) 10.

Figure 2:
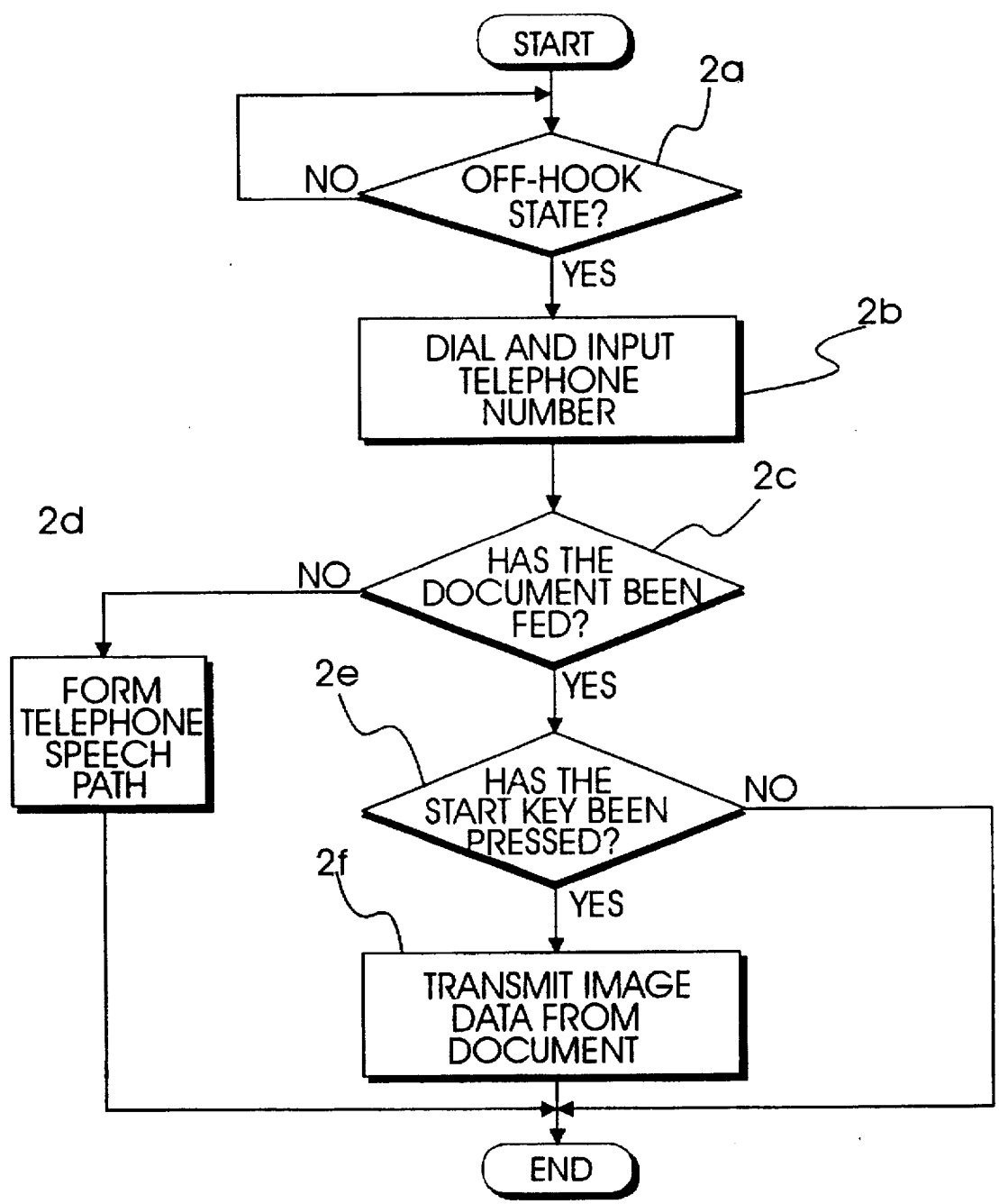
FIG. 2 is a flow chart illustrating a process for transmitting image data from a document in the conventional facsimile system.

Referring to FIG. 2, a flow chart illustrating a process for transmitting image data from a document in a conventional facsimile system will now be described.

First, in step 2a, central processing unit (CPU) 10 detects whether the public telephone network indicates an off-hook state attributable to the pressing of a dialing key on operating panel (OPE) 30 or removal of a telephone handset from its hook. If the public telephone network indicates an off-hook state, central processing unit (CPU) 10 proceeds to step 2b where a telephone number is dialed by a user and input to modulator-demodulator (MODEM) 50 and line interface unit (LIU) 60. In step 2c, central processing unit (CPU) 10 detects whether the document from a document feeding cassette has been fed. If the document from the document feeding cassette has not been fed, central processing unit (CPU) 10 enables formation of the telephone speech path, at step 2d, so that a telephone conversation can be conducted. If, however, the document has been fed in step 2c, central processing unit (CPU) detects whether a start key has been pressed, in step 2e. If the start key has been pressed in step 2e, central processing unit (CPU) 10 transmits image data from the document, in step 2f. If, however, the start key has not been pressed in step 2e, central processing unit (CPU) 10 terminates the performance of the program.

In the conventional facsimile system, in order to transmit the image data contained in a document, the telephone number of a receiving party must be manually input by the user to effectuate the image data transmission process. Since the user must physically dial or otherwise input the receiver's telephone number, use of the conventional facsimile system has not been optimally simplified.

Figure 3:
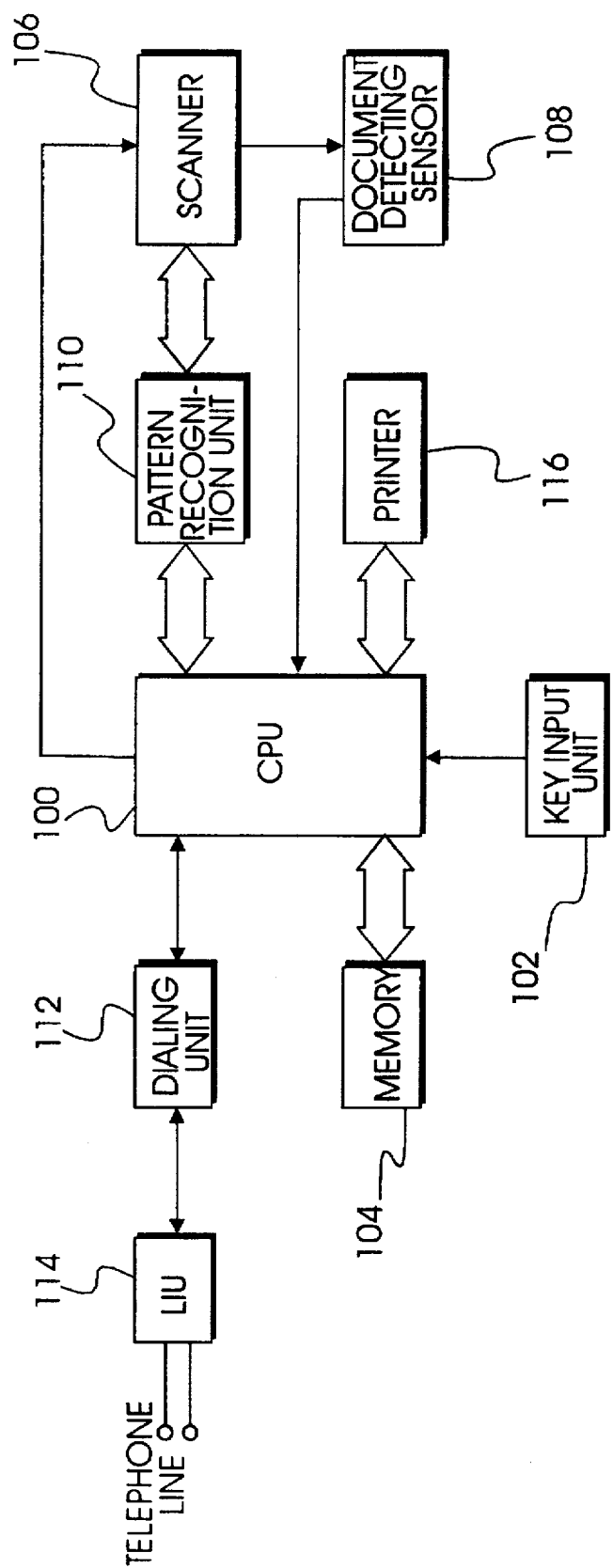
FIG. 3 is a block diagram illustrating a facsimile system constructed according to the principles of the present invention.

FIG. 3 is a block diagram illustrating a facsimile system constructed according to the principles of the present invention. In the facsimile system of FIG. 3, a central processing unit (CPU) 100 generally controls operation of the facsimile system and enables automatic transmission of image data from a document by dialing a telephone number recorded (i.e., handwritten, typed, etc.) on the document in response to entry of a transmission start key. A key input unit 102, which includes the transmission start key and a number of function keys, provides key data to central processing unit (CPU) 100 upon generation of the key data, and displays data under the control of central processing unit (CPU) 100. A memory 104 stores a program to enable recognition and dialing of the telephone number recorded on the document, and provides access to and stores data under the control of central processing unit (CPU) 100. A scanner 106 scans an image and the telephone number recorded on the document, converts the scanned image into digital image data, and transmits the digital image data to central processing unit (CPU) 100. A document detecting sensor 108 senses a loading state of the document based on inputs from scanner 106, to thereby provide data representative of the loading state to central processing unit (CPU) 100. A pattern recognition unit 110 recognizes the pattern of the telephone number scanned by scanner 106 to thereby provide the recognized pattern to central processing unit (CPU) 100. A dialing unit 112 transmits a dialing signal through the public telephone network under the control of central processing unit (CPU) 100. A line interface unit (LIU) 114 forms a data transmission path with the public telephone network and interfaces signals between the public telephone network and the facsimile system under the control of central processing unit (CPU) 100. A printer 116 is provided to print images under the control of central processing unit (CPU) 100.

Figure 4:
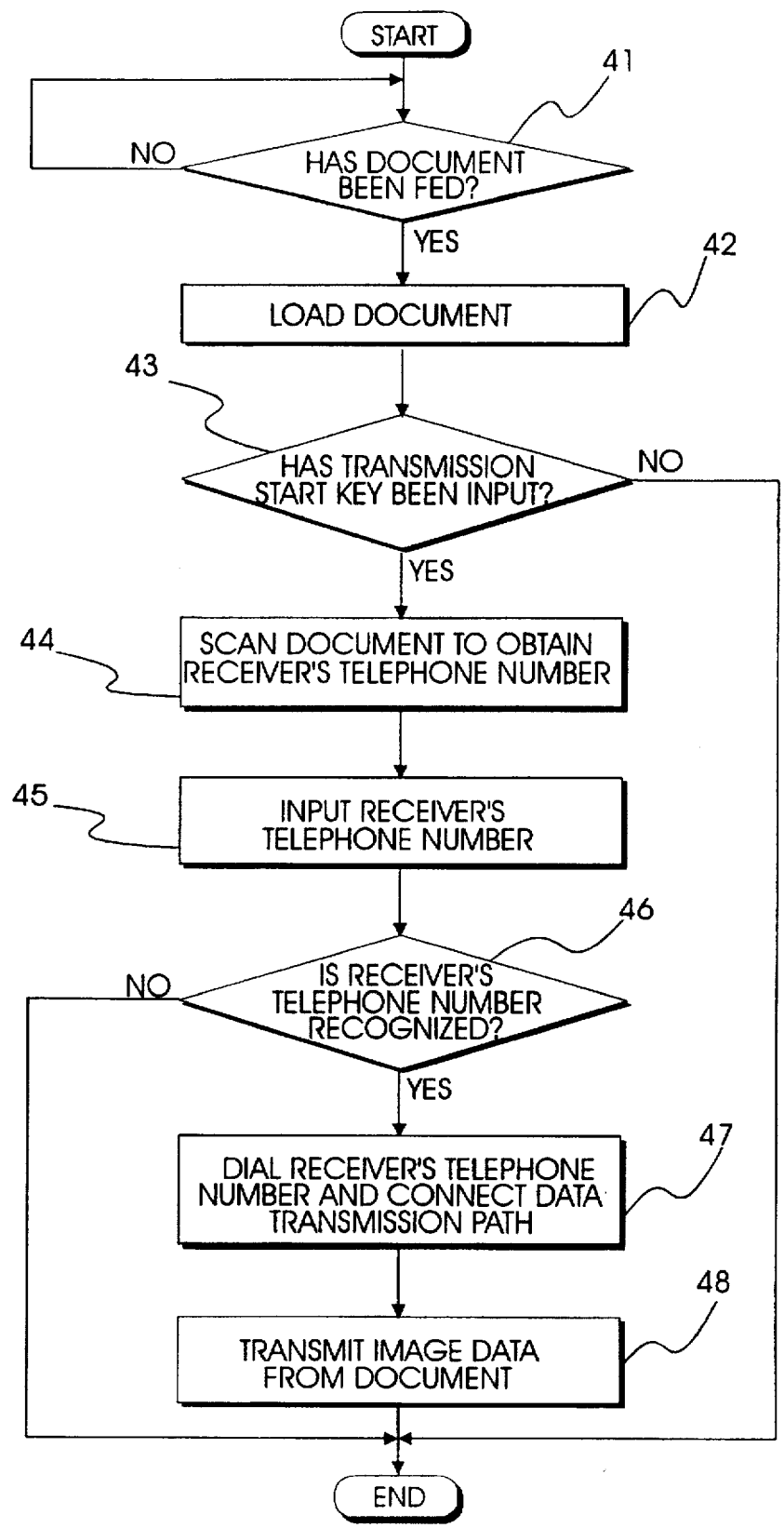
FIG. 4 is a flow chart illustrating a process for automatically transmitting image data from a document in a facsimile system constructed according to the principles of the present invention.

Referring now to FIG. 4, a flow chart illustrating a process for automatically transmitting data from a document in the facsimile system constructed according to the principles of the present invention is shown.

In FIG. 4, the process for automatically transmitting data from a document includes the steps of loading the document into the facsimile system by feeding the document in a document feeding cassette, scanning the document to obtain a receiver's telephone number after the transmission start key has been input, recognizing the receiver's telephone number, dialing the receiver's telephone number and forming a data transmission path between the facsimile system and the receiver's facsimile system, and transmitting image data read from the document to the receiver's facsimile system.

An explanation of an embodiment constructed according to the principles of the present invention will now be described in detail with reference to FIGS. 3 and 4.

First, when the user places the document into the document feeding cassette (not shown) of the scanner in order to transmit the document, document detecting sensor 108 senses this condition and provides a document detecting signal to central processing unit (CPU) 100. Central processing unit (CPU) 100 awaits input of the transmission start signal from key input unit 102 and, when the transmission start key is input, the document is scanned to read the receiver's telephone number which is located at a predetermined position on the face of the document. The scanned telephone number is then provided to pattern recognition unit 110 where the scanned telephone number is compared with a pre-set image pattern of Arabic numerals, to thereby provide a recognized telephone number to central processing unit (CPU) 100. Central processing unit (CPU) 100 provides the recognized telephone number to dialing unit 112. Dialing unit 112 performs a dialing operation by transmitting a dialing signal corresponding to the recognized telephone number to the public telephone network via line interface unit (LIU) 114. Once the data transmission path is formed, image data from the document scanned through scanner 106 is transmitted to a facsimile device corresponding to the receiver's telephone number.

A process for transmitting image data recorded on a document by recognizing a pattern recorded on the document representative of the receiver's telephone number and automatically dialing the receiver's telephone number will be described below with reference to FIG. 4.

First, in step 41, central processing unit (CPU) 100 determines whether the document has been fed into the document feeding cassette and detected by document detecting sensor 108. Once the document is fed, the document is loaded into the facsimile system, in step 42. In step 43, central processing unit (CPU) 100 determines whether the transmission start key has been input from key input unit 102. If the transmission start key has not been input, the program is terminated. If the transmission start key has been input, central processing unit (CPU) 100 controls scanner 106 to scan and obtain the receiver's telephone number which is recorded at a specific, predetermined region on the document. Next, in step 45, the receiver's telephone number obtained from scanning the document is provided to pattern recognition unit 110 where the receiver's telephone number is compared with the pre-set image pattern of Arabic numerals, to thereby provide the receiver's telephone number to central processing unit (CPU) 100. In step 46, central processing unit (CPU) 100 then determines whether the receiver's telephone number has been recognized. That is, central processing unit (CPU) 100 determines whether the receiver's telephone number scanned from the document corresponds to a specific pattern of recognized numerals. When the receiver's telephone number is recognized, central processing unit (CPU) 100 proceeds to step 47 where dialing unit 112 dials the receiver's recognized telephone number and the data transmission path is formed with the facsimile device corresponding to the receiver's telephone number. Finally, in step 48, central processing unit (CPU) 100 controls scanner 106 to scan the image data of the document and enables transmission of the scanned image data to the receiver's facsimile device through the public telephone network.

In the embodiment of the present invention described above, the image data recognized by pattern recognition unit 110 is comprised of Arabic numerals representative of the receiver's telephone number. In other embodiments, however, the image data recognized by pattern recognition unit 110 that identifies the receiver may be a name, trademark, logo, etc. In such embodiments, the receiver's telephone number corresponding to a name, trademark, logo, etc., is stored beforehand in memory 104. Accordingly, the receiver's telephone number corresponding to the recognized image pattern, whether it be a name, trademark or logo, is read from memory 104 and provided to dialing unit 112 to thereby facilitate performance of the dialing operation.

As described above, the facsimile system of the present invention has advantages in that image data on a document corresponding to a receiver's telephone number can be identified so that the receiver's telephone number is automatically dialed, and image data from the document is transmitted to a facsimile device corresponding to the receiver's telephone number. Accordingly, the function of the facsimile system can be improved, the operation of transmitting image data from a document is simplified, and the facsimile system can be easily used by a user.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A facsimile device, comprising:
   document detecting means for detecting entry of a document bearing image data into said facsimile device, said image data comprising a telephone number of a receiving party;
   scanning means for scanning said document and reading said telephone number from an image bearing surface of said document in direct response to a user input initiating a facsimile transmission operation accommodating transmission of said image data as a telecommunication signal, said user input being provided after said document has been conveyed into said facsimile system; and
   means for recognizing said telephone number read from said image bearing surface of said document, and upon recognition of said telephone number, automatically dialing said telephone number to form a data transmission path with said receiving party.

2. A method for transmitting image data in a facsimile transmission device, said method comprising the steps of:
   determining whether a document bearing said image data has been conveyed into said facsimile transmission device, said image data comprising a predetermined pattern corresponding to a facsimile receiving device;
   after said document has been conveyed into said facsimile transmission device, determining whether a transmission start key indicating commencement of a facsimile transmission operation has been entered;
   after said transmission start key has been entered, scanning a predetermined portion of said document to read said predetermined pattern from said document;
   identifying a telephone number corresponding to said predetermined pattern, performing an operation of automatically dialing said telephone number and forming a data transmission path accommodating transmission of said image data as a telecommunications signal between said facsimile transmission device and said facsimile receiving device; and then
   transmitting said image data borne upon said document from said facsimile transmission device to said facsimile receiving device.

3. The method as claimed in claim 2, wherein said predetermined pattern further comprises one of a name, a trademark and a logo for a party corresponding to said facsimile receiving device.

4. A method for transmitting image data in a facsimile transmission device, said method comprising the steps of:
   determining whether a document borne with said image data has been fed into said facsimile transmission device, said image data comprising a telephone number of a facsimile receiving device;
   after said document has been fed into said facsimile transmission device, determining whether a transmission start key indicating commencement of a facsimile transmission operation has been entered;
   after said transmission start key has been entered, scanning a predetermined portion of said document to read said telephone number from said document;
   automatically dialing said telephone number read from said document and forming a data transmission path between said facsimile transmission device and said facsimile receiving device; and then
   transmitting said image data borne upon said document from said facsimile transmission device to said facsimile receiving device.

5. A facsimile transmission device, comprising:
   document detecting means for detecting entry of a document bearing image data into said facsimile transmission device, said image data comprising a telephone number of a facsimile receiving device;
   means for providing a user input indicating a request to transmit said image data borne upon said document to said facsimile receiving device, said user input being provided after said document has been conveyed into said facsimile transmission device;
   scanning means for scanning said image data borne by said document and for reading said telephone number from an image bearing surface of said document in direct response to said user input;
   means for performing an operation of recognizing said telephone number read from said image bearing surface of said document; and
   means for automatically dialing said telephone number in response to recognition of said telephone number to form a data transmission path accommodating transmission of said image data as a telecommunications signal between said facsimile transmission device and said facsimile receiving device.

6. The facsimile transmission device of claim 5, further comprising interfacing means connected to a telephone network for providing said data transmission path between said facsimile transmission device and said facsimile receiving device.

7. A facsimile device, comprising:

document detecting means for detecting entry of a document bearing image data into said facsimile device, said image data comprising a predetermined pattern corresponding to a receiving party, said predetermined pattern comprising one of a name, a trademark and a logo corresponding to said receiving party;

scanning means for scanning said document to read said predetermined pattern from an image bearing surface of said document in direct response to user input of a transmission start key provided after said document has been conveyed into said facsimile device; and means for performing an operation of identifying a telephone number corresponding to said receiving party in response to reading said predetermined pattern from said image bearing surface of said document, and upon identification of said telephone number, automatically dialing said telephone number to form a data transmission path accommodating transmission of said image data as a telecommunications signal to said receiving party.

8. The facsimile device as claimed in claim 1, further comprised of said facsimile device terminating operation when said user input is not provided after said document has been fed into said facsimile device.

9. The method as claimed in claim 2, further comprised of said facsimile transmission device refraining from performing said facsimile transmission operation for said image data when said transmission start key is not entered after said document has been conveyed into said facsimile transmission device.

10. The method as claimed in claim 4, further comprised of said facsimile transmission device refraining from performing said facsimile transmission operation when said transmission start key is not entered after said document has been fed into said facsimile transmission device.

11. The facsimile transmission device as claimed in claim 5, further comprised of said facsimile transmission device terminating said operation when said user input is not provided after said document has been conveyed into said facsimile transmission device.

12. The facsimile device as claimed in claim 7, further comprised of said facsimile device terminating said operation when said user input is not provided after said document has been conveyed into said facsimile device.

* * * * *